United States Patent [19]

Watson

[11] Patent Number: 4,481,685
[45] Date of Patent: Nov. 13, 1984

[54] BASSINET RESTRAINT FOR INFANTS

[76] Inventor: Ian J. Watson, 7 Tingara St., Whitebridge, Australia

[21] Appl. No.: 401,171

[22] Filed: Jul. 23, 1982

[51] Int. Cl.³ .............................................. A47D 7/04
[52] U.S. Cl. ............................................ 5/94; 5/118; 5/100; 248/147
[58] Field of Search ....................... 5/94, 95, 100, 101, 5/107, 118; 248/147, 97, 99; 297/225, 250, 188; 280/801

[56] References Cited

U.S. PATENT DOCUMENTS

| | | | |
|---|---|---|---|
| 2,781,523 | 2/1952 | Scott | 5/100 |
| 3,044,078 | 7/1962 | Hamilton | 5/100 |
| 3,159,850 | 12/1964 | Aldrich et al. | 5/94 |
| 3,833,946 | 9/1974 | Von Wimmersperg | 5/94 |
| 4,190,285 | 2/1980 | Fleischer | 5/94 |
| 4,354,543 | 10/1982 | Bogner | 248/147 |
| 4,366,587 | 1/1983 | Takada | 5/94 |

FOREIGN PATENT DOCUMENTS 2306853 11/1976 France ............................... 5/94

*Primary Examiner*—Alexander Grosz
*Assistant Examiner*—Michael F. Trettel
*Attorney, Agent, or Firm*—Ladas & Parry

[57] ABSTRACT

Disclosed is a bassinet restraint for motor vehicles which offers significantly improved protection of a baby being carried within a motor vehicle. The bassinet restraint includes a base portion which is adapted to support the bottom of the bassinet and a cover portion which is engageable with the base portion, preferably via a hinged attachment, to the base portion. Attachment means are included to co-operate with standard motor vehicle seat belts so as to secure the bassinet restraint within the vehicle. It is preferred that the cover portion comprises a padded peripheral frame adapted to sit around a bassinet being contained by the restraint. The padded peripheral frame having a net stretched across its top so as to enclose the bassinet so that a baby will be safely contained therein. It is a feature of the disclosed bassinet restraint that in the event of a frontal collision the front edge of the bassinet will be tilted upwardly so that the impact force will be applied to a baby therein via the bottom of the bassinet which is normally well padded by a suitable mattress.

7 Claims, 9 Drawing Figures

BASSINET RESTRAINT FOR INFANTS

This invention relates to a bassinet restraint for infants and has been devised particularly to enable an infants's bassinet to be safely restrained in place on the rear seat of a motor vehicle in the event of a collision.

It is well known to provide seat belts in motor vehicles for the protection of passengers in the event of a collision and it is also known to provide safety seats for young children, which will afford similar protection. No provision has been made, however, for the protection of young babies carried in motor vehicles other than a general suggestion to place the baby in a bassinet on the floor in the rear of the vehicle behind the front seats. This location is still hazardous to the baby in the event of a collision in that the bassinet can become dislodged from its position or the baby may be violently propelled from the bassinet and injured in a collision against the interior part of the motor vehicle.

It is therefore an object of the present invention to provide a bassinet restraint which will obviate or minimize the foregoing disadvantages in a simple yet effective manner or which will at least provide the public with a useful choice.

Accordingly, the invention consists in a bassinet restraint for motor vehicles comprising a base portion arranged to support the bottom of said bassinet, a cover portion engageable with said base portion and arranged to cover and locate said bassinet between said cover portion and said base portion and attachment means arranged to engage with one or more seat belts in said motor vehicle so as to restrain said bassinet in place on a seat of said vehicle in use.

Notwithstanding any other forms that may fall within its scope, one preferred form of the invention will now be described by way of example only with reference to the accompanying drawings, in which.

Figure 1:
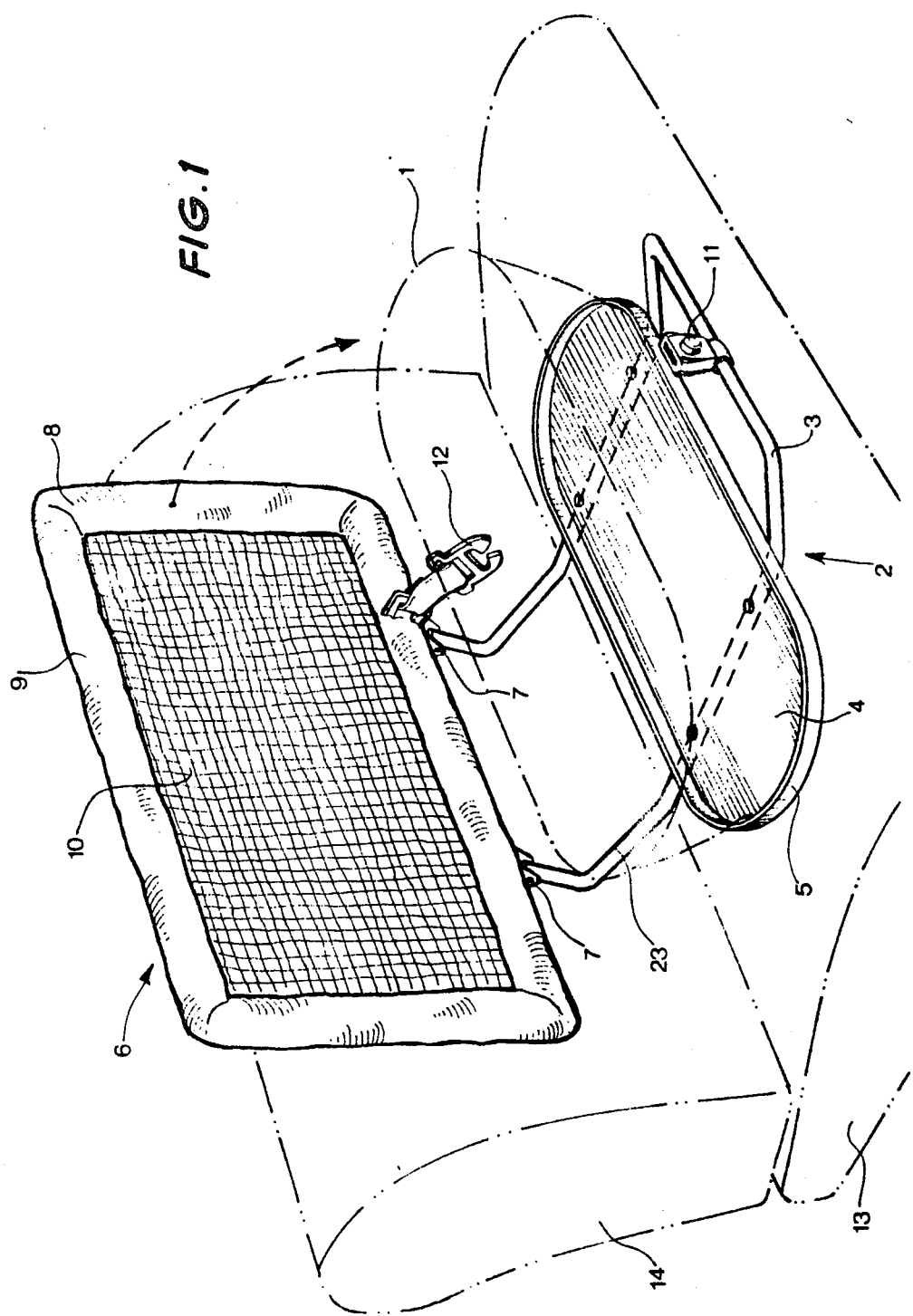
FIG. 1 is a perspective view of a bassinet restraint according to the invention in place on the seat of a motor vehicle showing the seat of the motor vehicle and the bassinet in broken outline.
Figure 2:
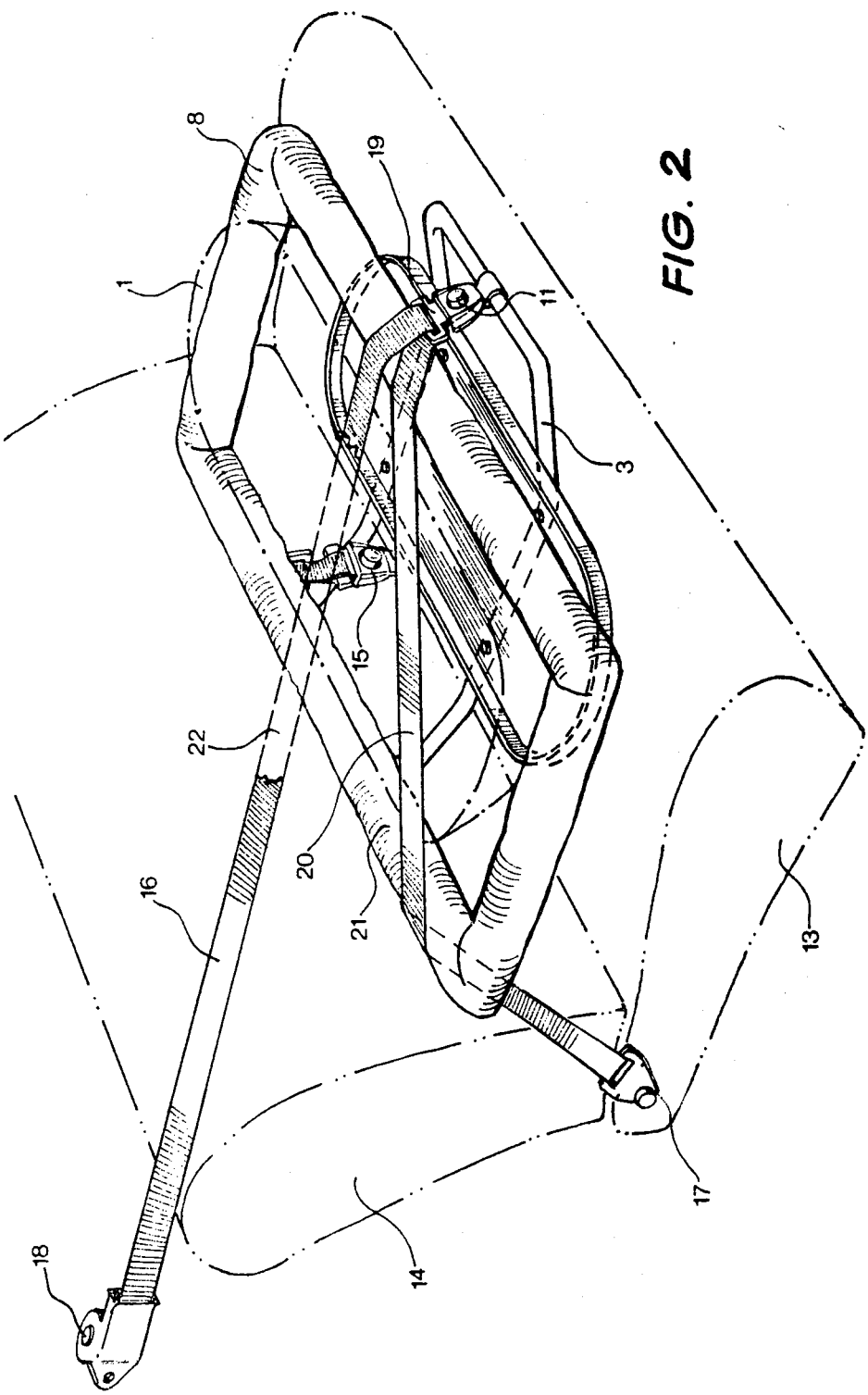
FIG. 2 is a perspective view similar to FIG. 1 showing the bassinet restraint in the closed position located by a combination lap/sash seat belt of the motor vehicle and omitting the netting of the cover for clarity.
Figure 3:
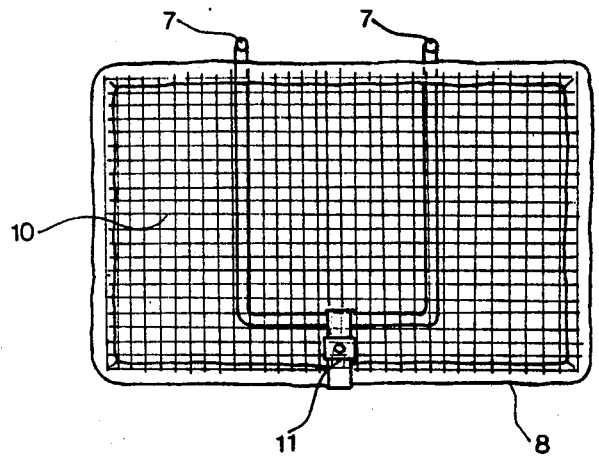
FIG. 3 is a plan view of the bassinet restraint according to the invention.
Figure 4:
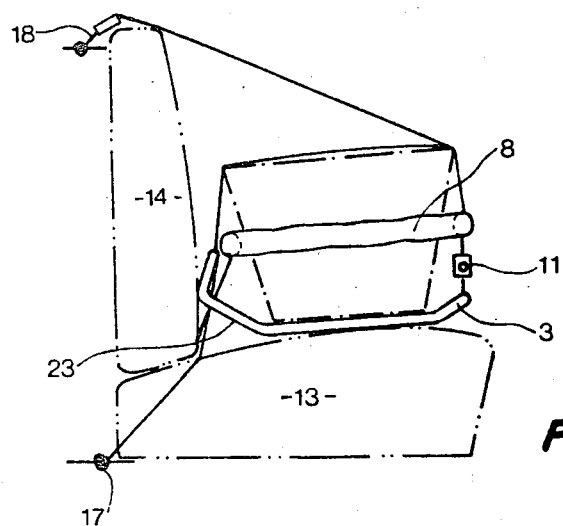
FIG. 4 is a diagrammatic side elevation of the configuration shown in FIG. 2.
Figure 5:
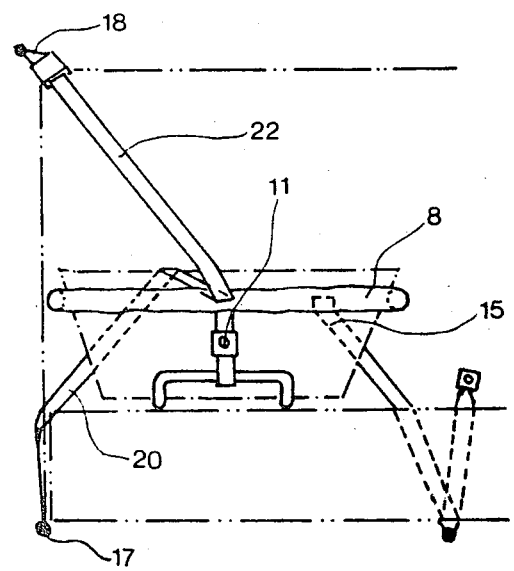
FIG. 5 is a diagrammatic frontal elevation of the construction shown in FIG. 4.

In the preferred form of the invention a bassinet restraint is constructed as follows:

The bassinet restraint is arranged to support a bassinet which is shown in broken outline at 1 in FIGS. 1 and 2. The bassinet restraint comprises a base portion 2 consisting of a base frame 3 which may, for example, be formed from steel tubing bent to a U-shape in plan view and to the profile as may be seen clearly in FIG. 4. The portion may optionally be provided with a base plate 4 formed, for example from a plastics or fibreglass material to the shape of the base of the bassinet 1 and which may include an upturned lip 5 arranged to locate the bassinet on the base plate.

The bassinet restraint further comprises a cover portion 6 engageable with the base portion 2 by any suitable engagement which may, for example, comprise a latch or catch but which, in the preferred form of the invention, comprises a hinged attachment in the form of hinge pins 7 located on the free ends of the U-shaped base frame 3. The cover portion comprises a peripheral frame 8 which is preferably covered with padding 9 and a net 10 which is stretched across the peripheral frame and fastened to the frame around the edges of the net. (The net has been omitted from FIG. 2 for clarity).

The bassinet restraint is provided with attachment means arranged to engage with the seat belts of the vehicle and, in the preferred form of the invention as shown in FIGS. 1 to 5, the attachment means are arranged to engage with a combination lap/sash seat belt commonly used on the rear seat of a motor vehicle. To this end the attachment means comprise an attachment point at the front of the bassinet restraint in the form of a socket 11 attached to the front of the U-shaped base frame 3 and adapted to engage the tongue of the lap/sash belt. The attachment means also include an attachment point at the rear of the bassinet restraint in the form of a tongue 12, which is attached to the peripheral frame 8 adjacent the hinge 7 and which is adapted to engage the short seat belt end socket or anchor protruding from the junction between the cushion 13 and the squab 14 of the motor vehicles rear seat. It will be appreciated that although the invention has been described for use on the rear seat of a motor vehicle, the bassinet restraint could also be used on the front seat of a motor vehicle in which case the tongue 12 is engaged with the seat belt end or stalk protruding upwardly at one side of the front seat.

In use the bassinet containing the baby is placed on the base portion 2 so that the bottom of the bassinet sits on the base plate 4 and is located by the lip 5. The cover portion 6 is then hinged downwardly to cover the bassinet so that the peripheral frame 8 extends around the upper periphery of the bassinet and the net 10 is stretched across the top of the bassinet to restrain the baby in the bassinet in the event of a collision. The restraint containing the bassinet is then placed on the rear seat of a motor vehicle so that the hinge parts 7 are to the rear of the seat and the tongue 12 is engaged with the socket 15, normally used to locate the inner end of the lap/sash seat belt. The lap/sash belt 16 which may, for example, be an inertia reel belt having a lower anchor point 17 and an inertia reel 18 is then pulled outwardly over the top of the bassinet restraint and the tongue 19 of the lap/sash belt engaged with the socket 11 on the front of the base frame of the bassinet restraint. The lap portion 20 of the belt passes from the anchor 17 upwardly over the rear edge 21 of the peripheral frame, diagonally across the top of the bassinet restraint, and then downwardly to the tongue 19. The sash portion 22 passes diagonally downwardly from the reel 18, across the top of the bassinet restraint to the tongue 19. Where an inertia reel belt is not available in the motor vehicle the lap/sash belt is engaged as before and then tightened to firmly hold the bassinet restraint in place.

In the event of a collision of the motor vehicle the bassinet is held firmly in place on the rear seat of the vehicle by the bassinet restraint which is located by the seat belt of the vehicle and the baby is safely retained within the bassinet by the net 10 across the top of the bassinet.

It is a further feature of the bassinet restraint according to the invention that it is designed that in the event of a common frontal collision the front edge of the bassinet is designed to tilt upwardly so that the impact force will force the baby against the bottom of the bassinet which is normally well padded by a mattress. The tilting action is achieved by securing the lap/sash belt 16 to the base frame 3 at its forward edge so that the sash belt 22 passes downwardly and forwardly from the upper attachment point 18 to the forward edge of the bassinet restraint. In an impact the tension in the sash belt 22 pulls the leading edge of the bassinet restraint upwardly causing the tilting movement referred to. This movement is assisted and eventually limited by the profile shape of the base frame 3 which is inclined upwardly in a rearward portion 23 as may be seen most clearly in FIG. 4.

Although the preferred form of the invention has been described for use with a conventional lap/sash combination belt in the rear of a motor vehicle, it will be appreciated that the bassinet restraint may be secured in place on the seat of a motor vehicle in a number of different ways. Several alternative configurations are shown in FIGS. 6 to 9 purely by way of example only and it will be appreciated that other alternative ways of fastening the bassinet restraint in place using the seat belts of a motor vehicle are possible.

Figure 6:
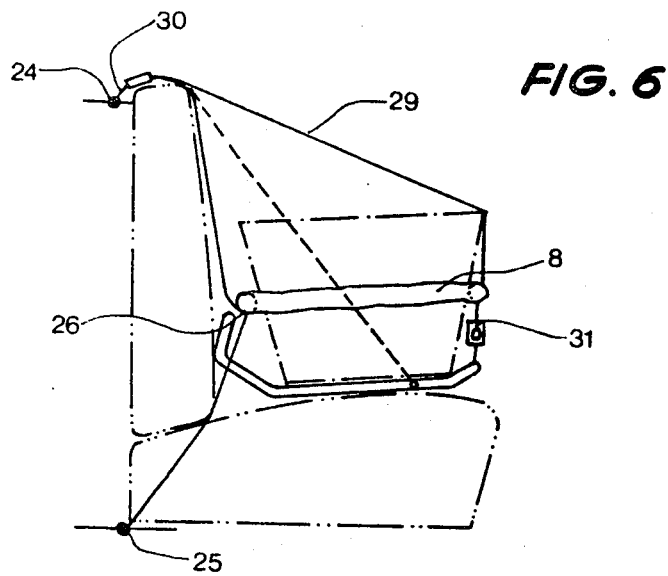
FIG. 6 is a diagrammatic side elevation of an alternative method of fastening a bassinet restraint according to the invention in place in a vehicle.
Figure 7:
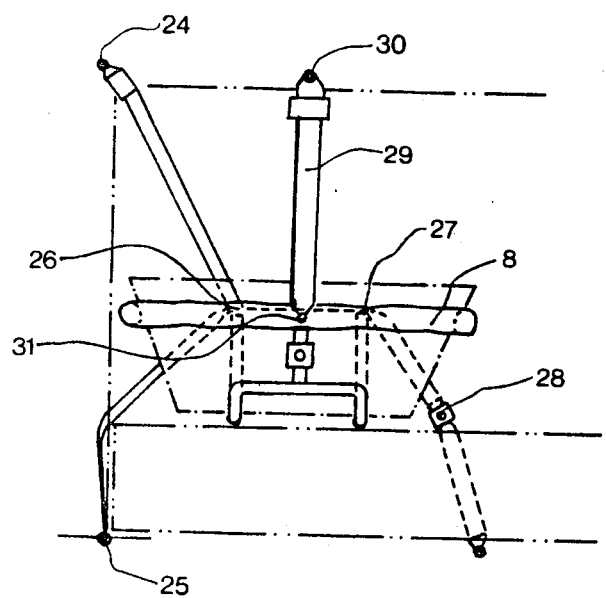
FIG. 7 is a front elevation of the configuration shown in FIG. 6.

In the configuration shown in FIG. 6 a lap/sash belt having an upper anchor point 24 and lower anchor point 25 is used whereby the lap/sash belt is attached to the rear of the peripheral frame at 26 and 27 and then clipped into the seat belt catch at 28. An additional belt 29 is attached to the rear parcel shelf of the vehicle at 30 and is led downwardly and forwardly to be attached to a point 31 at or near the front of the peripheral frame 8.

Figure 8:
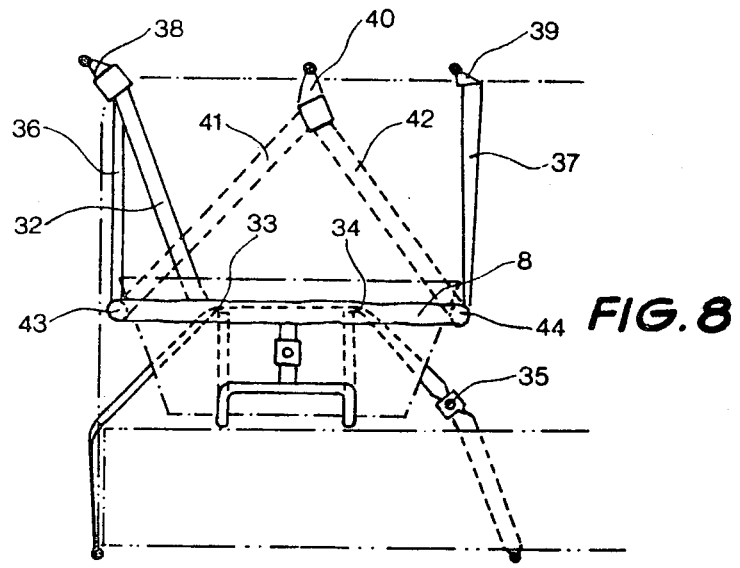
FIG. 8 is a frontal elevation of yet a further form of securing the bassinet restraint in a vehicle.

In the configuration shown in FIG. 8 a normal lap or lap/sash belt is used in combination with an additional pair of belts. The lap/sash belt 32 is attached to the rear of the peripheral frame 8 at 33 and 34 and then clipped into the seat belt catch at 35. A belt clip may be used at 33 to effectively clamp the belts together as one. Two additional belts 36 and 37 attached to the rear parcel shelf of the vehicle at 38 and 39, respectively, or alternatively both belts may be attached to single point 40 and led as shown in broken outline at 41 and 42. These additional belts are then attached at or near the front of the peripheral frame 8 at 43 and 44.

Figure 9:
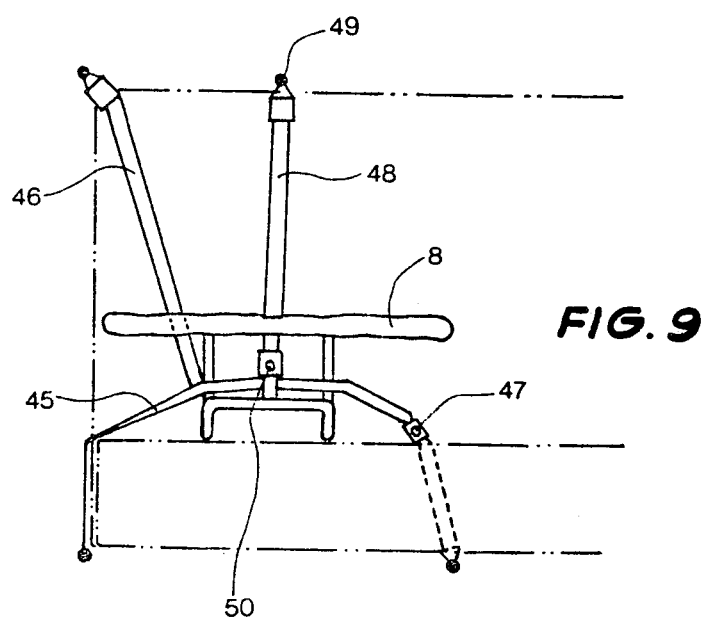
FIG. 9 is a yet further configuration of securing the bassinet restraint to a vehicle.

In the configuration shown in FIG. 9 a lap/sash belt 45 (which may alternatively be a single lap belt without the sash portion 46) is passed between the upper frame and the lower frame of the bassinet restraint and then clipped into the seat belt catch at 47. An additional belt 48 is provided attached to the rear parcel shelf at 49 and extending downwardly and forwardly to the clip to the front of the bassinet restraint at 50.

What I claim is:

1. A bassinet restraint for motor vehicles comprising a base portion arranged to support the bottom of said bassinet, a cover portion engageable with said base portion and arranged to cover, locate and engage said bassinet between said cover portion and said base portion, and attachment means arranged to engage with one or more seat-belts in said motor vehicle so as to restrain said bassinet in place on a seat vehicle in use wherein said attachment means includes an attachment means engageable with a seat-belt end protruding from the junction between the cushion and squab of the seat, and said base portion includes a rearwardly upwardly inclined portion adapted for said seat-belt to pass thereover when engaged with said attachment means so that upon a front or impact of said vehicle said inclined portion can slide forwardly under said belt as the forward edge of said bassinet tilts outwardly and upwardly.

2. A restraint as defined in claim 1 wherein said attachment means comprise tongues adapted to engage corresponding sockets of the vehicle seat belts.

3. A bassinet as claimed in claim 2 wherein said cover portion comprises a peripheral frame larger than the upper perimeter of said bassinet and a net extending across said peripheral frame and attached thereto so that said peripheral frame extends about an upper portion of said bassinet with said net extending across the opening thereof.

4. A bassinet restraint for motor vehicles comprising a base portion arranged to support the bottom of said bassinet, cover portion engageable with said base portion arranged to cover and locate said bassinet between said cover portion and said base portion, and attachment means arranged to engage with one or more seat belts in said motor vehicle so as to restrain said bassinet in place of a seat of said vehicle in use wherein said attachment means includes an attachment means at the front of said bassinet restraint adapted to engage a seat belt extending downwardly and forwardly over said bassinet restraint from an elevated point at the back of the seat from which the bassinet restraint is placed so that during a frontal impact of said vehicle the forward edge of said bassinet will tip outwardly and upwardly.

5. A bassinet restraint as defined in claim 4 wherein said attachment means comprise tongues adapted to engage corresponding sockets of the vehicle seat belts.

6. A bassinet restraint as defined in claim 4 wherein said attachment means comprise sockets adapted to engage corresponding tongues of the vehicle seat belts.

7. A bassinet as claimed in claim 4 wherein said cover portion comprises a peripheral frame larger than the upper perimeter of said bassinet and a net extending across said peripheral frame and attached thereto so that said peripheral frame extends about an upper portion of said bassinet with said net extending across the opening thereof.

* * * * *